(12) United States Patent
Lu

(10) Patent No.: US 11,991,556 B2
(45) Date of Patent: May 21, 2024

(54) METHOD FOR INDICATING STATE OF PDCP DUPLICATE DATA, TERMINAL DEVICE, AND NETWORK DEVICE

(71) Applicant: GUANGDONG OPPO MOBILE TELECOMMUNICATIONS CORP., LTD., Guangdong (CN)

(72) Inventor: Qianxi Lu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 345 days.

(21) Appl. No.: 17/210,890

(22) Filed: Mar. 24, 2021

(65) Prior Publication Data

US 2021/0211932 A1 Jul. 8, 2021

Related U.S. Application Data

(63) Continuation of application No. PCT/CN2018/112592, filed on Oct. 30, 2018.

(51) Int. Cl.
*H04W 28/06* (2009.01)
*H04W 76/27* (2018.01)
(Continued)

(52) U.S. Cl.
CPC ............ *H04W 28/06* (2013.01); *H04W 76/27* (2018.02); *H04W 80/02* (2013.01); *H04W 84/18* (2013.01)

(58) Field of Classification Search
CPC ..... H04W 28/06; H04W 76/27; H04W 80/02; H04W 84/18; H04W 28/04; H04W 76/15;
(Continued)

(56) References Cited

U.S. PATENT DOCUMENTS

2018/0279168 A1* 9/2018 Jheng .................... H04L 5/001
2018/0279262 A1  9/2018 Babaei et al.
(Continued)

FOREIGN PATENT DOCUMENTS

CN  104105132 A  10/2014
CN  104955064 A   9/2015
(Continued)

OTHER PUBLICATIONS

3GPP TSG RAN WG2 NR Ad Hoc; R2-1706716, Source: Huawei, HiSilicon; Title: Configuration and control of packet duplication, Qingdao, China, Jun. 27-29, 2017. (Year: 2017).*
(Continued)

*Primary Examiner* — Mohammed S Chowdhury
(74) *Attorney, Agent, or Firm* — PERKINS COIE LLP

(57) ABSTRACT

Provided in the implementations of the present disclosure are a method for indicating a state of PDCP duplicate data, a terminal device, and a network device. The method is applicable in the terminal device. The terminal device is provided with a first PDCP entity and multiple RLC entities corresponding to the first PDCP entity. The method includes: the terminal device receives first indication information, the first indication information being used for indicating data actions between the first PDCP entity and the multiple RLC entities. In an implementation, in a scenario of more than two PDCP copies (CA and DC appearing at the same time), the terminal device is still capable of making explicit the data actions between the first PDCP entity and each RLC entity of the multiple RLC entities, thus allowing the implementation of a way in which the multiple PDCP-corresponding RLC entities are to transmit data.

9 Claims, 4 Drawing Sheets

(51) Int. Cl.
*H04W 80/02* (2009.01)
*H04W 84/18* (2009.01)

(58) Field of Classification Search
CPC .... H04W 72/20; H04L 5/0053; H04L 1/1896; H04L 1/22; H04L 5/001; H04L 69/324
See application file for complete search history.

(56) References Cited

U.S. PATENT DOCUMENTS

| | | | |
|---|---|---|---|
| 2018/0367288 A1* | 12/2018 | Vrzic | H04W 36/22 |
| 2018/0368200 A1* | 12/2018 | Jin | H04L 1/20 |
| 2020/0119864 A1* | 4/2020 | Xu | H04W 76/15 |
| 2020/0266962 A1* | 8/2020 | Chen | H04L 1/1896 |
| 2021/0400529 A1* | 12/2021 | Wang | H04L 1/08 |

FOREIGN PATENT DOCUMENTS

| | | |
|---|---|---|
| CN | 108370304 A | 8/2018 |
| CN | 108616909 A | 10/2018 |
| WO | 2018170891 A1 | 9/2018 |
| WO | 2018171546 A1 | 9/2018 |

OTHER PUBLICATIONS

3GPP TSG-RAN2 Adhoc Meeting; R2-1706791; Source: Sharp ; Title: PDCP Duplication in CA, Qingdao, China, Jun. 27-29, 2017. (Year: 2017).*

3GPP TSG-RAN WG2 NR AdHoc; R2-1706866; Source: LG Electronics Inc.; Title: Remaining issues in packet duplication; Qingdao, China, Jun. 27-Jun. 29, 2017 (Year: 2017).*

3GPP TSG-RAN WG2 #98-AH; Tdoc R2-1707172; Source: Ericsson; Title: Packet duplication in CA; Qingdao, P.R. of China, Jun. 27-29, 2017 (Year: 2017).*

3GPP TSG-RAN WG3 #101bis; R3-185879; Source: Ericsson; Title: Discussion on support for PDCP Duplication with More than 2 Copies; Chengdu, China, Oct. 8-12, 2018. (Year: 2018).*

3GPP TSG-RAN WG3 #101bis; R3-185577; Source: ZTE; Title: Initial consideration on URLLC duplication enhancement; Chengdu, China, Oct. 8-12, 2018 (Year: 2018).*

Examination Report No. 1 for Australian Application No. 2018448123 dated Sep. 30, 2022. 3 pages.

International Search Report dated Jul. 30, 2019 cited in PCT/CN2018/112592.

Examination Report for European Application No. 18938669.1 dated Apr. 12, 2022. 9 pages.

3GPP "Medium Access Control (MAC) protocol specification (Release 16)" 3GPP TS 38.321 V16.3.0 (Feb. 2020). 155 pages.

EPO, Extended European Search Report for European Application No. 18938669.1, dated Aug. 2, 2021. 11 pages.

Huawei et al. "Configuration and control of packet duplication" R2-1706716; 3GPP TSG RAN WG2 NR Ad Hoc; Qingdao, China, Jun. 27-29, 2017. 6 pages.

Extended European Search Report for European Application No. 23162906.4 dated Apr. 21, 2023. 10 pages.

First Office Action for Chinese Application No. 202210105396.0 dated Mar. 9, 2023. 18 pages with English translation.

* cited by examiner

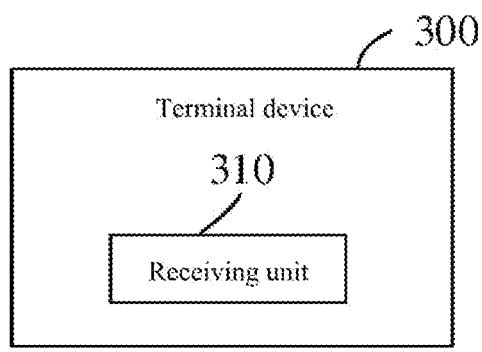
FIG. 6
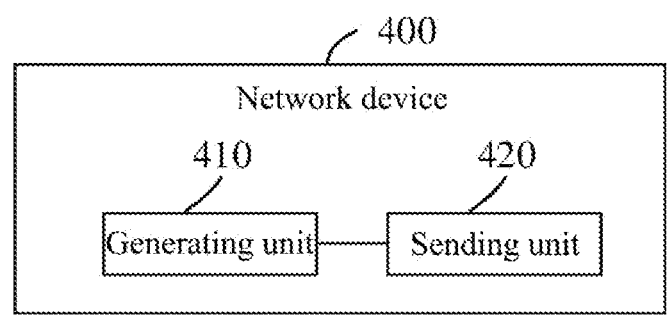
FIG. 7
FIG. 8

METHOD FOR INDICATING STATE OF PDCP DUPLICATE DATA, TERMINAL DEVICE, AND NETWORK DEVICE

CROSS-REFERENCE TO RELATED APPLICATION

The present application is a continuation application of International PCT Application No. PCT/CN2018/112592, filed on Oct. 30, 2018, the entire content of which is hereby incorporated by reference.

TECHNICAL FIELD

Implementations of the present disclosure relate to the field of communication, and more specifically, to a method for indicating a state of PDCP duplication data, a terminal device and a network device.

BACKGROUND

In data duplication, an NR has agreed to combine PDCP duplication functions of carrier aggregation (CA) and dual connectivity (DC) to transmit duplication data, so as to improve reliability of data transmission. That is, considering a higher resource use efficiency and reliability, a duplication mechanism of more than two PDCP copies is introduced. However, activation and deactivation mechanisms of PDCP in a CA scenario and activation and deactivation mechanisms in a DC scenario are not suitable for a scenario where CA and DC appear simultaneously. Therefore, how to realize activation and deactivation of PDCP under a scenario of more than two PDCP copies is a technical problem to be solved urgently in this field.

SUMMARY

Implementations of the present disclosure provide a method for indicating a state of PDCP duplication data, a terminal device and a network device, which can realize data transmission for PDCP corresponding to multiple RLC entities in a scenario of more than two PDCP copies.

In a first aspect, a method for indicating a state of PDCP duplication data is provided, wherein the method is applied to a terminal device, the terminal device has a first PDCP entity and multiple RLC entities corresponding to the first PDCP entity, and the method includes: receiving, by the terminal device, first indication information, wherein the first indication information is used for indicating a data behavior between the first PDCP entity and the multiple RLC entities.

In a second aspect, a method for indicating a state of PDCP duplication data is provided, including: generating, by a first network device, first indication information, wherein the first indication information is used for indicating a data behavior between a first PDCP entity of a terminal device and multiple RLC entities corresponding to the PDCP entity; and sending, by the first network device, the first indication information to the terminal device.

In a third aspect, a terminal device is provided, configured to perform the method in the above first aspect or each implementation thereof. Specifically, the terminal device includes function modules for performing the method in the above first aspect or each implementation thereof.

In a fourth aspect, a network device is provided, configured to perform the method in the above second aspect or each implementation thereof. Specifically, the network device includes function modules for performing the method in the above second aspect or each implementation thereof.

In a fifth aspect, a terminal device is provided, including a processor and a memory. The memory is configured to store a computer program, and the processor is configured to call and run the computer program stored in the memory to execute the method in the above first aspect or each implementation thereof.

In a sixth aspect, a network device is provided, including a processor and a memory. The memory is configured to store a computer program, and the processor is configured to call and run the computer program stored in the memory to execute the method in the above second aspect or each implementation thereof.

In a seventh aspect, a chip is provided, configured to implement the method in any one of the above first to second aspects or each implementation thereof. Specifically, the chip includes a processor, configured to call and run a computer program from a memory, so that a device in which the chip is installed performs the method in any one of the above first to second aspects or each implementation thereof.

In an eighth aspect, a computer readable storage medium is provided, configured to store a computer program, wherein the computer program enables a computer to perform the method in any one of the above first to second aspects or each implementation thereof.

In a ninth aspect, a computer program product is provided, including computer program instructions, wherein the computer program instructions enable a computer to perform the method in any one of the above first to second aspects or each implementation thereof.

In a tenth aspect, a computer program is provided, which, when being run on a computer, enables the computer to perform the method in any one of the above first to second aspects or each implementation thereof.

Based on the above technical solution, the network device may indicate a data behavior between a first PDCP entity of the terminal device and multiple RLC entities corresponding to the first PDCP entity through the first indication information, that is, can realize data transmission for PDCP corresponding to multiple RLC entities in a scenario of more than two PDCP copies (CA and DC appear simultaneously).

BRIEF DESCRIPTION OF DRAWINGS

FIG. 6 is yet another example of an MAC CE format according to an implementation of the present disclosure.

FIG. 7 is a schematic block diagram of a terminal device according to an implementation of the present disclosure.

FIG. 8 is a schematic block diagram of a network device according to an implementation of the present disclosure.

DETAILED DESCRIPTION

Figure 1:
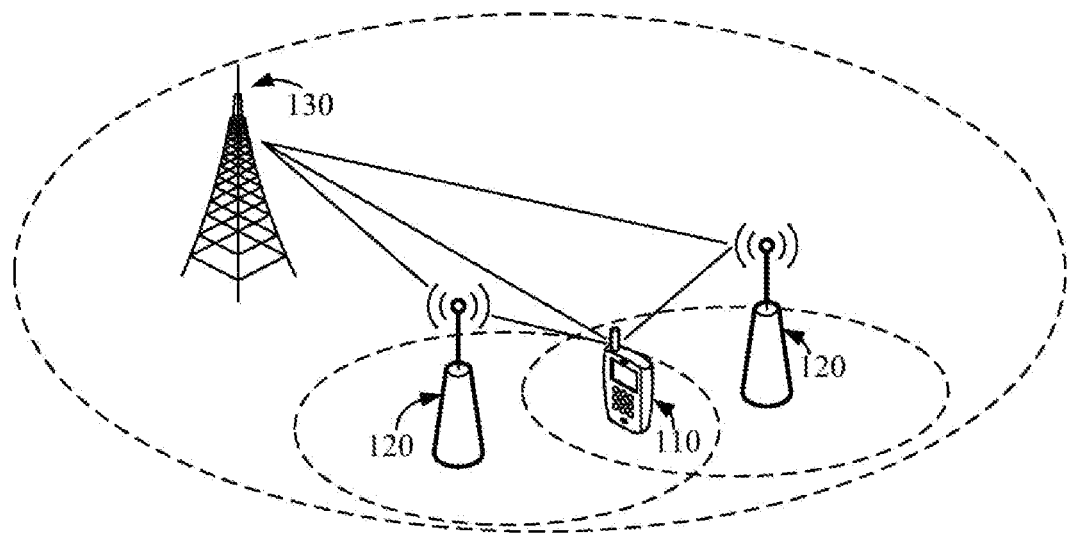
FIG. 1 is an example of an application scenario according to the present disclosure.

FIG. 1 is a schematic diagram of a system 100 according to an implementation of the present disclosure.

As shown in FIG. 1, a terminal device 110 is connected with a first network device 130 in a first communication system and second network devices 120 in a second communication system. For example, the first network device 130 is a network device in a Long Term Evolution (LTE), and each second network device 120 is a network device in a New Radio (NR).

Herein, the first network device 130 and the second network device 120 may include multiple cells.

It should be understood that FIG. 1 is an example of a communication system according to an implementation of the present disclosure, while the implementation of the present disclosure is not limited to what is shown in FIG. 1.

As an example, a communication system to which the implementation of the present disclosure is adapted may include at least multiple network devices in the first communication system and/or multiple network devices in the second communication system.

For example, the system 100 shown in FIG. 1 may include one main network device in the first communication system and at least one secondary network device in the second communication system. The at least one secondary network device is respectively connected with the one main network device to form multi-connection, and is respectively connected with a terminal device 110 to provide a service for it. Specifically, the terminal device 110 may simultaneously establish connections through the main network device and the secondary network device.

Optionally, the connection established between the terminal device 110 and the main network device is a main connection, and the connection established between the terminal device 110 and each secondary network device is a secondary connection. Control signaling of the terminal device 110 may be transmitted through the main connection, while data of the terminal device 110 may be transmitted simultaneously through the main connection and the secondary connection, or may be transmitted through the secondary connection only.

As another example, the first communication system and the second communication system in the implementation of the present disclosure are different, but specific categories of the first communication system and the second communication system are not limited.

For example, the first communication system and the second communication system may be various communication systems, such as a Global System of Mobile Communication (GSM) system, a Code Division Multiple Access (CDMA) system, a Wideband Code Division Multiple Access (WCDMA) system, a General Packet Radio Service (GPRS) system, a Long Term Evolution (LTE) system, an LTE Time Division Duplex (TDD) system, a Universal Mobile Telecommunication System (UMTS).

The main network device and the secondary network device may be any access network device.

Optionally, in some implementations, the access network device may be a Base Transceiver Station (BTS) in a Global System of Mobile Communication (GSM) system or Code Division Multiple Access (CDMA), or may be a NodeB (NB) in a Wideband Code Division Multiple Access (WCDMA) system, or may be an Evolutional Node B (eNB or eNodeB) in a Long Term Evolution (LTE) system.

Optionally, the access network device may also be a base station (gNB) in a Next Generation Radio Access Network (NG RAN) or an NR system, or a radio controller in a Cloud Radio Access Network (CRAN), or the access network device may be a relay station, an access point, an on-board device, a wearable device, or a network device in a future evolved Public Land Mobile Network (PLMN), etc.

In the system 100 shown in FIG. 1, the first network device 130 being a main network device, and the second network devices 120 being secondary network devices is taken as an example.

The first network device 130 may be an LTE network device, and each second network device 120 may be an NR network device. Or the first network device 130 may be an NR network device, and each second network device 120 may be an LTE network device. Or both the first network device 130 and the second network devices 120 may be NR network devices. Or the first network device 130 may be a GSM network device, or a CDMA network device, etc., and each second network device 120 may also be a GSM network device, or a CDMA network device, etc. Or the first network device 130 may be a Macrocell, and each second network device 120 may be a Microcell, a Picocell or a Femtocell, etc.

Optionally, the terminal device 110 may be any terminal device, and the terminal device 110 includes but is not limited to:

an apparatus, configured to receive/send a communication signal, via a wired circuit connection, for example, via Public Switched Telephone Networks (PSTN), a Digital Subscriber Line (DSL), a digital cable, a direct cable connection; and/or another data connection/network; and/or via a wireless interface, for instance, for a cellular network, a Wireless Local Area Network (WLAN), a digital television network such as a DVB-H network, a satellite network, or an AM-FM broadcast sender; and/or another terminal device; and/or an Internet of Things (IoT) device. A terminal device configured to communicate via a wireless interface may be referred to as a "wireless communication terminal", a "wireless terminal" or a "mobile terminal". Examples of the mobile terminal include, but not limited to, a satellite or cellular telephone, a Personal Communication System (PCS) terminal capable of combining with a cellular wireless telephone and data processing, faxing, and data communication abilities, a Personal Digital Assistant (PDA) that may include a radio telephone, a pager, an internet/intranet access, a Web browser, a memo pad, a calendar, and/or a Global Positioning System (GPS) receiver, and a conventional laptop and/or palmtop receiver or another electronic apparatus including a radio telephone transceiver. Optionally, the terminal device may be referred to as an access terminal, a User Equipment (UE), a subscriber unit, a subscriber station, a mobile station, a mobile platform, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or another processing device connected to a wireless modem, a vehicle-mounted device, a wearable device, a terminal device in a 5G network, or a terminal device in a future evolved Public Land Mobile Network (PLMN), or the like.

It should be understood that the terms "system" and "network" are often used interchangeably in this document.

Figure 2:
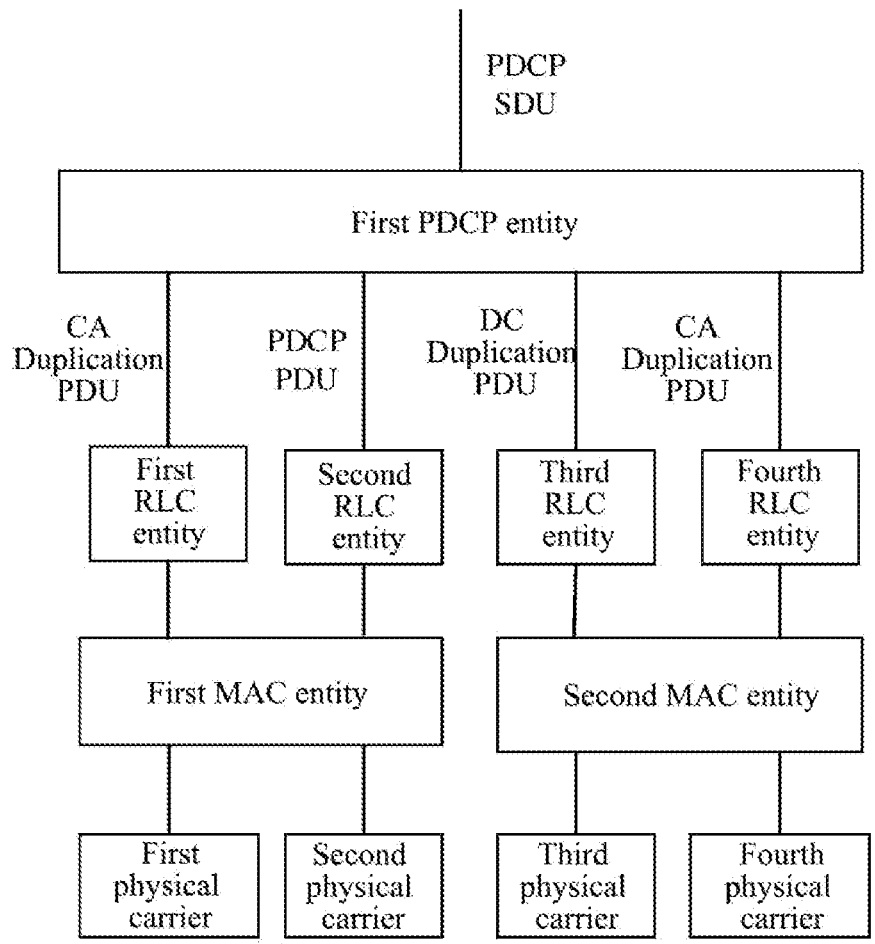
FIG. 2 is an example of a scenario where there are more than two PDCP copies according to an implementation according to the present disclosure.

FIG. 2 is an example of a scenario where more than two PDCP copies appear simultaneously according to an implementation of the present disclosure.

As shown in FIG. 2 and FIG. 1, the terminal device has a first PDCP entity, a first Radio Link Control (RLC) entity, a second RLC entity, a third RLC entity and a fourth RLC entity, a first MAC entity and a second MAC entity, a first physical carrier, a second physical carrier, a third physical carrier and a fourth physical carrier.

Herein, the first PDCP entity corresponds to the first RLC entity, the second RLC entity, the third RLC entity and the fourth RLC entity, the first RLC entity and the second RLC entity correspond to the first physical carrier and the second physical carrier respectively through the first MAC entity, and the third RLC entity and the fourth RLC entity correspond to the third physical carrier and the fourth physical carrier respectively through the second MAC entity.

Data generated by the first PDCP layer (one PDCP PDU, two CA duplication PDUs and one DC duplication PDU) is respectively transmitted to four different RLC entities (the first RLC entity, the second RLC entity, the third RLC entity and the fourth RLC entity), and the four different RLC entities are mapped to different physical layer carriers (the first physical carrier, the second physical carrier, the third physical carrier and the fourth physical carrier) by two Media Access Control (MAC) entities (the first MAC entity and the second MAC entity). Finally data transmission is achieved.

From the perspective of CA, in an implementation of the present disclosure, when data duplication of the first PDCP entity is in an active state, data generated by the first PDCP entity (two CA duplication PDUs) is mapped to different physical layer carriers through different RLC entities respectively, which can achieve a purpose of frequency diversity gain, and can further improve reliability of data transmission.

From the perspective of a Dual Connection (DC), multiple Cell Groups (CGs) may serve a same terminal device, and transmission of duplication data may be performed between the Cell Groups and the terminal device. Optionally, in some implementations of the present disclosure, a CG may be equivalent to a network node or a network device, etc. Optionally, a protocol architecture of split bearers is adopted for a transmission mode of duplication data in the DC scenario. A Packet Data Convergence Protocol (PDCP) is located in a certain CG (a Master CG (MCG) or a Secondary CG (SCG)), wherein the CG is an "anchor CG".

As shown in FIG. 2, the first MAC entity may be an MAC entity corresponding to a first node, and the second MAC entity may be an MAC entity corresponding to a second node.

The first PDCP entity duplicates a PDCP Protocol Data Unit (PDU) into four identical copies, such as one PDCP PDU and three duplicated PDCP PDUs, wherein the three PDCP PDUs are generated by duplication through a combination of CA and DC. For example, one is a PDCP PDU and the other is a CA duplication PDU, and the two PDCP PDUs send and/or receive data through Radio Link Control (RLC) layers of different CGs (i.e., nodes corresponding to different MAC entities).

In implementations of the present disclosure, two PDCP PDUs are sent through different CGs, a purpose of frequency diversity gain can be achieved, and thus reliability of data transmission can be improved.

It should be understood that each sublayer in the implementation of the present disclosure may send data to a designated layer of a receiving end according to a difference of data of the protocol data unit. Data which enters each sublayer and has not been processed is called a service data unit (SDU), and data in a specific format after being processed by the sublayer is called a Protocol Data Unit (PDU). An SDU is an information unit delivered from a higher layer protocol to a lower layer protocol. Original data of an SDU is a PDU of an upper layer of a protocol. In other words, a PDU formed by the present layer is an SDU of a lower layer.

For example, each logical channel of each terminal device has an RLC entity, and data received by the RLC entity from a PDCP layer or data sent to the PDCP layer may be referred to as an RLC SDU (or a PDCP PDU). Data received by an RLC entity from an MAC layer or data sent to the MAC layer may be referred to as an RLC PDU (or an MAC SDU).

It should also be understood that in the implementation of the present disclosure, the RLC layer is located between the PDCP layer and the MAC layer, and the RLC layer may communicate with the PDCP layer through a Service Access Point (SAP) and communicate with the MAC layer through a logical channel. However, the implementations of the present disclosure are not limited thereto.

It should be noted that for DC transmission, an uplink PDCP data duplication function is a function which may be configured based on a DRB, that is to say, it may be configured that different DRBs may support PDCP duplication data transmission, or PDCP duplication data transmission may not be configured. For CA transmission, duplicated PDCP PDUs are transmitted to two RLC entities (two different logical channels) respectively by using the duplication data function of PDCP, and it is finally ensured that the duplicated PDCP PDU can be transmitted on different physical layer aggregation carriers, thus achieving a frequency diversity gain to improve data transmission reliability. While in an MAC protocol, activation and deactivation states of a duplication function is notified by MAC CE.

It may be found that no matter in the CA scenario or the DC scenario, only one type of duplication corresponding to the DRB will be configured at the same time, and only two RLC entities are involved, and RLC entities are not distinguished during activation and deactivation, and the data radio bearer (DRB) is taken as an execution unit.

That is to say, activation and deactivation mechanisms of PDCP in a CA scenario and activation and deactivation mechanisms in a DC scenario are not suitable for a scenario where CA and DC appear simultaneously. Therefore, how to realize activation and deactivation of PDCP in a scenario of more than two PDCP copies (CA and DC appear simultaneously) is a technical problem to be solved urgently in this field.

Implementations of the present disclosure provide a method for indicating a state of PDCP duplication data, which can realize data transmission for PDCP corresponding to multiple RLC entities in a scenario of more than two PDCP copies (CA and DC appear simultaneously).

Figures 3, 4, 5:
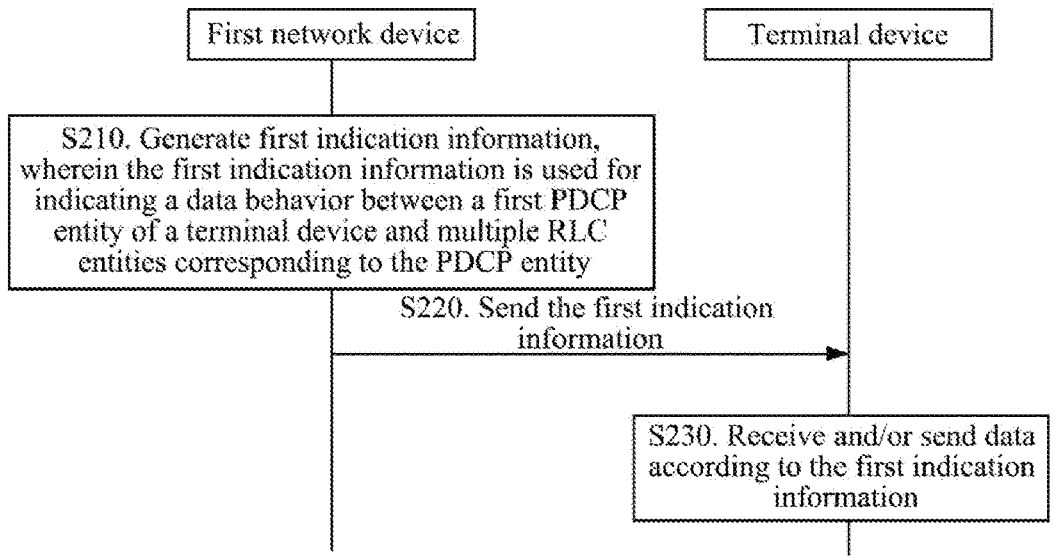
FIG. 3 is a schematic flowchart of a method for indicating a state of PDCP duplication data according to an implementation of the present disclosure.
FIG. 4 is an example of an MAC CE format according to an implementation of the present disclosure.
FIG. 5 is another example of an MAC CE format according to an implementation of the present disclosure.

FIG. 3 shows a schematic flowchart of a method 200 for indicating a state of PDCP duplication data according to an implementation of the present disclosure, and the method 200 may be performed by a terminal device and a network device. The terminal device shown in FIG. 2 may be the terminal device shown in FIG. 1, and the terminal device has a first PDCP entity and multiple RLC entities corresponding to the first PDCP entity. The network device shown in FIG. 2 may be an access network device as shown in FIG. 1. The method 200 includes part or all of following contents:

In S210, a first network device generates first indication information, wherein the first indication information is used for indicating a data behavior between a first PDCP entity of a terminal device and multiple RLC entities corresponding to the PDCP entity.

In S220, the first network device sends the first indication information to the terminal device.

In S230, the terminal device receives and/or sends data according to the first indication information.

The first indication information in the implementation of the present disclosure is used for indicating the data behavior between the first PDCP entity and the multiple RLC entities. Therefore, in the scenario of more than two PDCP copies (CA and DC appear simultaneously), the terminal device can also clarify the data behavior between the first PDCP entity and each RLC entity among the multiple RLC entities, and then can realize whether the RLC entities corresponding to PDCP transmit duplication data or realize activation and deactivation of PDCP copies.

It should be understood that the behaviors of receiving and/or sending data in the implementation of the present disclosure may be collectively referred to as data behaviors.

In other words, the first network device generates and sends the first indication information to the terminal device. The terminal device receives the first indication information. Herein, the first indication information is used for indicating the data behavior between the first PDCP entity and the multiple RLC entities.

Optionally, in some implementations of the present disclosure, the multiple RLC entities include at least two of the following RLC entities: a first RLC entity, a second RLC entity, a third RLC entity and a fourth RLC entity.

The first indication information is used for indicating a data behavior between the first PDCP entity and at least one RLC entity among the first RLC entity, the second RLC entity, the third RLC entity and the fourth RLC entity.

In other words, in the implementation of the present disclosure, the terminal device may have four RLC entities, but the RLC entity activated by the terminal device may be at least one of the four RLC entities. Or, the RLC entity deactivated by the terminal device may be at least one of the four RLC entities.

For example, the first indication information may include at least one bit. For example, a format of the first indication information may include, but is not limited to, whether the first PDCP entity receives data from or sends data to (the first RLC entity, the second RLC entity, the third RLC entity and the fourth RLC entity), wherein 0 means not to sending, and 1 means sending. For example, the first indication information may be any one of the following:

(0, 1, 0, 0), (1, 0, 0, 0), (0, 0, 1, 0), (0, 0, 0, 1), (1, 0, 1, 0), (1, 1, 0, 0), (1, 0, 0, 1), (0, 1, 1, 0), (0, 1, 0, 1), (0, 0, 1, 1), (1, 1, 1, 0), (1, 0, 1, 1), (1, 1, 0, 1), (0, 1, 1, 1), or (1, 1, 1, 1).

Optionally, in some implementations of the present disclosure, the terminal device receives Radio Resource Control (RRC) signaling, wherein the RRC signaling includes information for indicating an initial state of duplication data of the first PDCP entity. That is, the terminal device may make, through RRC signaling, the first PDCP entity correspond to the initial state of duplication data transmission of the RLC entity.

Optionally, in some other implementations of the present disclosure, the terminal device receives any one of the following information including the first indication information: a Media Access Control (MAC) Control Element (CE), a Radio Resource Control (RRC) signaling or a Physical Layer (PHY) signaling.

That is, after the terminal device determines the initial state of duplication data transmission of the RLC entity corresponding to the first PDCP entity through the RRC signaling, a state of duplication data of the first PDCP entity may be changed through the first indication information.

A specific implementation mode in which the terminal device receives the first indication information through the MAC CE will be described in detail below.

Optionally, in some implementations of the present disclosure, the terminal device receiving the first indication information includes:

the terminal device receives an MAC CE format, wherein the MAC CE format includes the first indication information.

FIG. 4 to FIG. 6 are examples of an MAC CE format according to an implementation of the present disclosure.

As shown in FIG. 4, taking a first MAC entity as an example, the MAC CE format may use 4 bits to indicate the state of the duplication data of the first PDCP entity corresponding to the first MAC entity, wherein Di represents an i-th DRB (an i-th DRB ID after DRB IDs are arranged in an ascending order) corresponding to the first MAC entity. For example, Di represents the first DRB corresponding to the first MAC entity. That is, each column represents one DRB. Four rows represent at least three RLC entities corresponding to the first DRB. For example, each row represents an RLC entity. That is, Oct i represents an i-th RLC entity, for example, Oct 1 represents the first RLC entity. Specifically, which row represents which RLC entity may be specified according to a protocol, or indicated by a base station, or according to ordering of logical channel IDs, or according to MN before SN, etc. The implementations of the present disclosure are not specifically limited thereto. Optionally, if the RLC entity does not correspond to the first MAC entity receiving the MAC CE, the first MAC entity may determine the state of the duplication data of the first PDCP entity corresponding to the first MAC entity by interacting with another MAC entity.

It should be understood that FIG. 4 is only an example of the 4 bit MAC CE format, but the implementations of the present disclosure are not limited thereto.

For example, as shown in FIG. 5, each row may correspond to two DRBs, and each column corresponds to four DRBs.

As shown in FIG. 6, taking the first MAC entity as an example, the MAC CE format may use 2 bits to indicate the state of the duplication data of the first PDCP entity corresponding to the first MAC entity, wherein Di represents an i-th DRB (an i-th DRB ID after DRB IDs are arranged in an ascending order) corresponding to the MAC entity. Two rows represent at least three RLC entities corresponding to the DRB. Which specific row represents which RLC entity may be specified according to the protocol, or indicated by a base station, or according to ordering of logical channel IDs, or according to MN before SN, etc. The implementations of the present disclosure are not specifically limited thereto. Optionally, if the RLC entity does not correspond to the first MAC entity receiving the MAC CE, the first MAC entity may determine the state of the duplication data of the first PDCP entity corresponding to the first MAC entity by interacting with another MAC entity.

For example, bits in the first row represent a state of PDCP duplication data on a corresponding MN, and bits in the second row represent a state of PDCP duplication data on a corresponding SN.

For another example, bits in the first row represent a state of PDCP duplication data on a corresponding same MAC entity, and bits in the second row represent a state of PDCP duplication data on a corresponding SN.

For another example, bits in the first row represent a state of PDCP duplication data on a corresponding same MAC entity, and bits in the second row represent a state of PDCP duplication data on a corresponding MN.

For another example, bits in the first row represent a state of PDCP duplication data corresponding to a first RLC entity on a corresponding MAC entity, and bits in the second row represent a state of PDCP duplication data corresponding to a second RLC entity on a corresponding MAC entity.

For another example, bits in the first row represent a state of corresponding PDCP duplication data on a corresponding MAC entity, and bits in the second row represent a state of corresponding PDCP duplication data on another MAC entity.

Optionally, in some implementations of the present disclosure, the terminal device receives second indication information, wherein the second indication information is used for indicating whether the first indication information is included in the MAC CE format. That is to say, when the first indication information is carried in the MAC CE format, the terminal device needs to determine in advance whether the first indication information is carried in the MAC CE format.

Optionally, in some implementations of the present disclosure, the terminal device receives a reserved index in a Logical Channel Identifier (LCID) of a DownLink Shared Channel (DL-SCH), wherein the reserved index is used for indicating whether the first indication information is included in the MAC CE format.

In other words, the second indication information is a reserved index in the LCD of the DL-SCH.

Optionally, the reserved index in the LCD of the DL-SCH may include multiple indexes. In an implementation of the present disclosure, whether the first indication information is included in the MAC CE format may be indicated by one of the multiple indexes. For example, a reserved index 101110 is selected for representing the MAC CE including the first indication information. However, the implementations of the present disclosure are not limited thereto. For example, in another alternative implementation, the network device may also send the first indication information to the terminal device in another form. For example, the first indication information may be carried in another message.

The specific indication mode of the first indication information in the implementation of the present disclosure will be exemplarily explained below.

Optionally, in some implementations of the present disclosure, the terminal device receives an MAC CE sent by a first network device, wherein the MAC CE is used for indicating a data behavior between the first PDCP entity and a corresponding RLC entity which is corresponding to the Data Radio Bearer (DRB) between the first network device and the terminal device and the RLC entity corresponding to the first PDCP entity.

In other words, the first indication information indicates the data behavior between the first PDCP entity and the RLC entity corresponding to the first PDCP entity with the DRB taken as a unit.

Optionally, in some other implementations of the present disclosure, the terminal device receives MAC CEs sent by the first network device and a second network device respectively; wherein the MAC CE sent by the first network device is used for indicating a data behavior between an RLC entity corresponding to a first MAC entity and a PDCP entity corresponding to a Data Radio Bearer (DRB) between the first network device and the terminal device, wherein the first MAC entity includes an MAC entity of the terminal device corresponding to the first network device; the MAC CE sent by the second network device is used for indicating a data behavior between an RLC entity corresponding to the second MAC entity and a PDCP entity corresponding to a Data Radio Bearer (DRB) between the second network device and the terminal device, and the second MAC entity includes an MAC entity of the terminal device corresponding to the second network device.

In other words, the first indication information indicates the data behavior between the first PDCP entity and the RLC entity corresponding to the first PDCP entity with the DRB and the network device taken as units.

Optionally, in some implementations of the present disclosure, a quantity of bits of the MAC CE sent by the first network device and a quantity of bits of the MAC CE sent by the second network device are same.

Optionally, in some implementations of the present disclosure, a quantity of bits of the MAC CE sent by the first network device and a quantity of bits of the MAC CE sent by the second network device are different.

Optionally, in some implementations of the present disclosure, the MAC CE sent by the first network device and/or the second network device includes at least one bit. For example, the first network device and/or the second network device is indicated by using 1 bit, 2 bits, 3 bits and 4 bits.

Optionally, in some implementations of the present disclosure, the terminal device receives first indication information sent by the first network device, wherein the first indication information is used for indicating a data behavior between the first PDCP entity and an RLC entity corresponding to the second network device, and/or the first indication information is used for indicating a data behavior between the first PDCP entity and an RLC entity corresponding to the first network device.

In other words, the first indication information indicates the data behavior between the first PDCP entity and the RLC entity corresponding to the first PDCP entity with the network device taken as a unit.

Optionally, in some implementations of the present disclosure, the first network device is a Master Node (MN) or a Secondary Node (SN), and/or the second network device is an MN or an SN.

Specifically, the first network device is the MN, and the second network device is the SN. Or, the first network device is the SN and the second network device is the MN. Or, the first network device is the SN and the second network device is the SN.

Optionally, in some implementations of the present disclosure, the method further includes:

the terminal device reports capability information of the terminal device, wherein the capability information includes whether the first PDCP entity supports a behavior of transmitting data with at least three RLC entities.

Optionally, in some implementations of the present disclosure, the capability information further includes: a quantity of RLC entities that can implement a behavior of data transmission with the first PDCP entity.

For example, in the system architecture shown in FIG. 2, a quantity of RLC entities that can have a behavior of data transmission with the first PDCP entity is 4. That is, a first RLC entity, a second RLC entity, a third RLC entity and a fourth RLC entity.

Optionally, in some implementations of the present disclosure, the method further includes:

the terminal device receives trigger information, wherein the trigger information is used for triggering the terminal device to report the capability information.

Optionally, in some implementations of the present disclosure, the terminal device receives a first type of MAC CE or a second type of MAC CE; wherein the first type of MAC CE is used for indicating a data behavior between an RLC entity and the first PDCP entity corresponding to a first Data Radio Bearer (DRB), and the second type of MAC CE is used for indicating a data behavior between an RLC entity and the first PDCP entity corresponding to a second DRB, wherein the first DRB and the second DRB are different.

Optionally, in some implementations of the present disclosure, the first type of MAC CE and the second type of MAC CE are same. In other words, states of duplication data of PDCP entities corresponding to different DRBs are indicated by the same type of MAC CEs.

Optionally, in some implementations of the present disclosure, the first type of MAC CE and the second type of MAC CE are different. In other words, states of duplication data of PDCP entities corresponding to different DRBs are indicated by different types of MAC CEs.

The following is an exemplary description of different types of MAC CE.

Optionally, in some implementations of the present disclosure, the first type of MAC CE is used for indicating a data behavior between two RLC entities and the first PDCP entity corresponding to the first DRB.

Optionally, in some implementations of the present disclosure, the second type of MAC CE is used for indicating a data behavior between the first PDCP entity corresponding to the second DRB and at least three RLC entities.

Optionally, in some implementations of the present disclosure, the terminal device may indicate a state of PDCP entity duplication data corresponding to the DRB to a higher layer through an MAC entity.

For example, when the terminal device receives an MAC CE through an MAC entity, if the MAC CE is used for indicating to activate a data behavior between an RLC entity and a PDCP entity corresponding to a Data Radio Bearer (DRB), the terminal device indicates a state of duplication data of PDCP entity corresponding to the DRB to a higher layer through the MAC entity.

For another example, when the terminal device receives an MAC CE through an MAC entity, if the MAC CE is used for indicating to deactivate a data behavior between an RLC entity and a PDCP entity corresponding to a Data Radio Bearer (DRB), the terminal device indicates a state of duplication data of PDCP entity corresponding to the DRB to a higher layer through the MAC entity.

Preferred implementations of the present disclosure have been described in detail above with reference to the accompanying drawings, but the present disclosure is not limited to the specific details in the above implementations. Within the scope of technical conception of the present disclosure, various simple modifications may be made to the technical solutions of the present disclosure, wherein these simple modifications all belong to the protection scope of the present disclosure.

For example, the various specific technical features described in the above specific implementations may be combined in any suitable manner without contradiction. In order to avoid unnecessary repetition, various possible combination modes are not explained separately in the present disclosure.

For another example, various different implementations of the present disclosure may be combined arbitrarily, and as long as they do not violate the idea of the present disclosure, they should also be regarded as the contents disclosed in the present disclosure.

It should be understood that sequence numbers of the foregoing processes do not mean execution sequences in various method implementations of the present disclosure. The execution sequences of the processes should be determined according to functions and internal logic of the processes, and should not be construed as any limitation on the implementation processes of the implementations of the present disclosure.

Method implementations of the present disclosure are described in detail above with reference to FIG. 1 to FIG. 5. Apparatus implementations of the present disclosure are described in detail below with reference to FIG. 7 to FIG. 10.

FIG. 7 is a schematic block diagram of a terminal device 300 according to an implementation of the present disclosure. The terminal device 300 has a first PDCP entity and multiple RLC entities corresponding to the first PDCP entity.

Specifically, as shown in FIG. 7, the terminal device 300 may include: a receiving unit 310, configured to receive first indication information, wherein the first indication information is used for indicating a data behavior between the first PDCP entity and the multiple RLC entities.

Optionally, in some implementations of the present disclosure, the multiple RLC entities include at least two of the following RLC entities: a first RLC entity, a second RLC entity, a third RLC entity and a fourth RLC entity; wherein the first indication information is used for indicating a data behavior between the first PDCP entity and at least one RLC entity among the first RLC entity, the second RLC entity, the third RLC entity and the fourth RLC entity.

Optionally, in some implementations of the present disclosure, the receiving unit 310 is further configured to: receive Radio Resource Control (RRC) signaling, wherein the RRC signaling includes information for indicating an initial state of duplication data of the first PDCP entity.

Optionally, in some implementations of the present disclosure, the receiving unit 310 is specifically configured to receive any one of the following information including the first indication information: a Media Access Control (MAC) Control Element (CE), a Radio Resource Control (RRC) signaling and a Physical Layer (PHY) signaling.

Optionally, in some implementations of the present disclosure, the receiving unit 310 is specifically configured to: receive an MAC CE format, wherein the MAC CE format includes the first indication information.

Optionally, in some implementations of the present disclosure, the receiving unit 310 is further configured to: receive second indication information, wherein the second indication information is used for indicating whether the first indication information is included in the MAC CE format.

Optionally, in some implementations of the present disclosure, the receiving unit 310 is specifically configured to: receive a reserved index in a Logical Channel Identifier (LCID) of a DownLink Shared Channel (DL-SCH), wherein the reserved index is used for indicating whether the first indication information is included in the MAC CE format.

Optionally, in some implementations of the present disclosure, the receiving unit 310 is specifically configured to: receive an MAC CE sent by a first network device, wherein the MAC CE is used for indicating a data behavior between an RLC entity corresponding to the first PDCP entity and the first PDCP entity corresponding to a Data Radio Bearer (DRB) between the first network device and the terminal device.

Optionally, in some implementations of the present disclosure, the receiving unit 310 is specifically configured to: receive MAC CEs sent by a first network device and a second network device respectively.

The MAC CE sent by the first network device is used for indicating a data behavior between an RLC entity corresponding to a first MAC entity and a PDCP entity corresponding to a Data Radio Bearer (DRB) between the first network device and the terminal device, wherein the first MAC entity includes an MAC entity of the terminal device corresponding to the first network device.

The MAC CE sent by the second network device is used for indicating a data behavior between an RLC entity corresponding to a second MAC entity and a PDCP entity corresponding to a Data Radio Bearer (DRB) between the second network device and the terminal device, wherein the second MAC entity includes an MAC entity of the terminal device corresponding to the second network device.

Optionally, in some implementations of the present disclosure, a quantity of bits of the MAC CE sent by the first network device and a quantity of bits of the MAC CE sent by the second network device are same.

Optionally, in some implementations of the present disclosure, a quantity of bits of the MAC CE sent by the first network device and a quantity of bits of the MAC CE sent by the second network device are different.

Optionally, in some implementations of the present disclosure, the MAC CE sent by the first network device and/or the second network device includes at least one bit.

Optionally, in some implementations of the present disclosure, the receiving unit 310 is specifically configured to: receive first indication information sent by the first network device, wherein the first indication information is used for indicating a data behavior between the first PDCP entity and an RLC entity corresponding to the second network device, and/or the first indication information is used for indicating a data behavior between the first PDCP entity and an RLC entity corresponding to the first network device.

Optionally, in some implementations of the present disclosure, the first network device is a Master Node (MN) or a Secondary Node (SN), and/or the second network device is an MN or an SN.

Optionally, in some implementations of the present disclosure, the terminal device further includes: a reporting unit, configured to report capability information of the terminal device, wherein the capability information includes whether the first PDCP entity supports a behavior of transmitting data with at least three RLC entities.

Optionally, in some implementations of the present disclosure, the capability information further includes: a quantity of RLC entities capable of implementing a behavior of data transmission with the first PDCP entity.

Optionally, in some implementations of the present disclosure, the receiving unit 310 is further configured to: receive trigger information, wherein the trigger information is used for triggering the terminal device to report the capability information.

Optionally, in some implementations of the present disclosure, the receiving unit 310 is specifically configured to: receive a first type of MAC CE or a second type of MAC CE.

The first type of MAC CE is used for indicating a data behavior between an RLC entity and the first PDCP entity corresponding to a first Data Radio Bearer (DRB), and the second type of MAC CE is used for indicating a data behavior between an RLC entity and the first PDCP entity corresponding to a second DRB, wherein the first DRB and the second DRB are different.

Optionally, in some implementations of the present disclosure, the first type of MAC CE and the second type of MAC CE are same.

Optionally, in some implementations of the present disclosure, the first type of MAC CE and the second type of MAC CE are different.

Optionally, in some implementations of the present disclosure, the first type of MAC CE is used for indicating a data behavior between the first PDCP entity corresponding to the first DRB and two RLC entities.

Optionally, in some implementations of the present disclosure, the second type of MAC CE is used for indicating a data behavior between the first PDCP entity corresponding to the second DRB and at least three RLC entities.

Optionally, in some implementations of the present disclosure, when the terminal device receives an MAC CE through an MAC entity, if the MAC CE is used for indicating to activate a data behavior between an RLC entity and a PDCP entity corresponding to a Data Radio Bearer (DRB), the terminal device indicates a state of duplication data of PDCP entity corresponding to the DRB to a higher layer through the MAC entity.

Optionally, in some implementations of the present disclosure, when the terminal device receives an MAC CE through an MAC entity, if the MAC CE is used for indicating to deactivate a data behavior between an RLC entity and a PDCP entity corresponding to a Data Radio Bearer (DRB), the terminal device indicates a state of duplication data of PDCP entity corresponding to the DRB to a higher layer through the MAC entity.

FIG. 8 is a schematic block diagram of a network device 400 according to an implementation of the present disclosure.

As shown in FIG. 8, the network device 400 may include: a generating unit 410, configured to generate first indication information, wherein the first indication information is used for indicating a data behavior between a first PDCP entity of a terminal device and multiple RLC entities corresponding to the PDCP entity; and a sending unit 420, configured to send the first indication information to the terminal device.

Optionally, in some implementations of the present disclosure, the multiple RLC entities include at least two of the following RLC entities: a first RLC entity, a second RLC entity, a third RLC entity and a fourth RLC entity.

The first indication information is used for indicating a data behavior between the first PDCP entity and at least one RLC entity among the first RLC entity, the second RLC entity, the third RLC entity and the fourth RLC entity.

Optionally, in some implementations of the present disclosure, the sending unit 420 is specifically configured to: send Radio Resource Control (RRC) signaling to the terminal device, wherein the RRC signaling includes information for indicating an initial state of duplication data of the first PDCP entity.

Optionally, in some implementations of the present disclosure, the sending unit 420 is specifically configured to send to the terminal device any one of the following information including the first indication information: a Media Access Control (MAC) Control Element (CE), a Radio Resource Control (RRC) signaling and a Physical Layer (PHY) signaling.

Optionally, in some implementations of the present disclosure, the sending unit 420 is specifically configured to:

send an MAC CE format to the terminal device, wherein the MAC CE format includes the first indication information.

Optionally, in some implementations of the present disclosure, the sending unit 420 is further configured to: send second indication information to the terminal device, wherein the second indication information is used for indicating whether the first indication information is included in the MAC CE format.

Optionally, in some implementations of the present disclosure, the sending unit 420 is specifically configured to: send a reserved index in a Logical Channel Identifier (LCD) of a DownLink Shared Channel (DL-SCH) to the terminal device, wherein the reserved index is used for indicating whether the first indication information is included in the MAC CE format.

Optionally, in some implementations of the present disclosure, the sending unit 420 is specifically configured to: send an MAC CE to the terminal device, wherein the MAC CE is used for indicating a data behavior between an RLC entity corresponding to the first PDCP entity and the first PDCP entity corresponding to a Data Radio Bearer (DRB) between the network device and the terminal device.

Optionally, in some implementations of the present disclosure, the sending unit 420 is specifically configured to: send an MAC CE to the terminal device, wherein the MAC CE sent by the network device is used for indicating a data behavior between an RLC entity corresponding to a first MAC entity and a PDCP entity corresponding to a Data Radio Bearer (DRB) between the network device and the terminal device, the first MAC entity includes an MAC entity of the terminal device corresponding to the network device.

Optionally, in some implementations of the present disclosure, a quantity of bits of the MAC CE sent by the network device and a quantity of bits of the MAC CE sent by a second network device are same.

Optionally, in some implementations of the present disclosure, a quantity of bits of the MAC CE sent by the network device and a quantity of bits of the MAC CE sent by a second network device are different.

Optionally, in some implementations of the present disclosure, the MAC CE sent by the network device and/or the second network device includes at least one bit.

Optionally, in some implementations of the present disclosure, the sending unit 420 is specifically configured to: send first indication information to the terminal device, wherein the first indication information is used for indicating a data behavior between the first PDCP entity and an RLC entity corresponding to a second network device, and/or the first indication information is used for indicating a data behavior between the first PDCP entity and an RLC entity corresponding to the network device.

Optionally, in some implementations of the present disclosure, the network device is a Master Node (MN) or a Secondary Node (SN), and/or the second network device is an MN or an SN.

Optionally, in some implementations of the present disclosure, the network device further includes: a receiving unit, configured to receive capability information of the terminal device reported by the terminal device, wherein the capability information includes whether the first PDCP entity supports a behavior of transmitting data with at least three RLC entities.

Optionally, in some implementations of the present disclosure, the capability information further includes: a quantity of RLC entities capable of implementing a behavior of data transmission with the first PDCP entity.

Optionally, in some implementations of the present disclosure, the sending unit 420 is further configured to: send trigger information to the terminal device, wherein the trigger information is used for triggering the terminal device to report the capability information. Optionally, in some implementations of the present disclosure, the sending unit 420 is specifically configured to: send a first type of MAC CE or a second type of MAC CE to the terminal device.

The first type of MAC CE is used for indicating a data behavior between an RLC entity and the first PDCP entity corresponding to a first Data Radio Bearer (DRB), and the second type of MAC CE is used for indicating a data behavior between an RLC entity and the first PDCP entity corresponding to a second DRB, wherein the first DRB and the second DRB are different.

Optionally, in some implementations of the present disclosure, the first type of MAC CE and the second type of MAC CE are same.

Optionally, in some implementations of the present disclosure, the first type of MAC CE and the second type of MAC CE are different.

Optionally, in some implementations of the present disclosure, the first type of MAC CE is used for indicating a data behavior between the first PDCP entity corresponding to the first DRB and two RLC entities.

Optionally, in some implementations of the present disclosure, the second type of MAC CE is used for indicating a data behavior between the first PDCP entity corresponding to the second DRB and at least three RLC entities.

It should be understood that the apparatus implementations and the method implementations may correspond to each other, and description of the method implementations may be referred to for similar description of the apparatus implementations. Specifically, the terminal device 300 shown in FIG. 7 and the network device 400 shown in FIG. 8 may correspond to the corresponding subjects in the method 200 of the implementation of the present disclosure, and the aforementioned and other operations and/or functions of various units in the terminal device 300 and the network device 400 are respectively for implementing the corresponding processes in various methods in FIG. 2, which will not be repeated here for the sake of brevity.

In the above, the communication device according to the implementation of the present disclosure is described from the perspective of functional modules with reference to FIG. 7 and FIG. 8. It should be understood that the functional module may be realized in a form of hardware, instructions in a form of software, or a combination of hardware and software modules.

Specifically, acts of the method implementation in the implementation of the present disclosure may be accomplished by hardware integrated logic circuits in the processor and/or instructions in the form of software, and acts of the method disclosed with reference to the implementation of the present disclosure may be directly embodied as being executed and accomplished by a hardware decoding processor, or by a combination of hardware and software modules in the decoding processor.

Optionally, the software module may be located in a storage medium commonly used in the art, such as a random memory, a flash memory, a read-only memory, a programmable read-only memory, an electrically erasable programmable memory, or a register, etc. The storage medium is located in the memory, and the processor reads information in the memory and accomplishes the acts of the above method implementation in combination with hardware thereof.

For example, in an implementation of the present disclosure, the receiving unit 310 shown in FIG. 7 and the sending unit 420 shown in FIG. 8 may be implemented by transceivers, and the generating unit 410 shown in FIG. 8 may be implemented by a processor.

Figure 9:
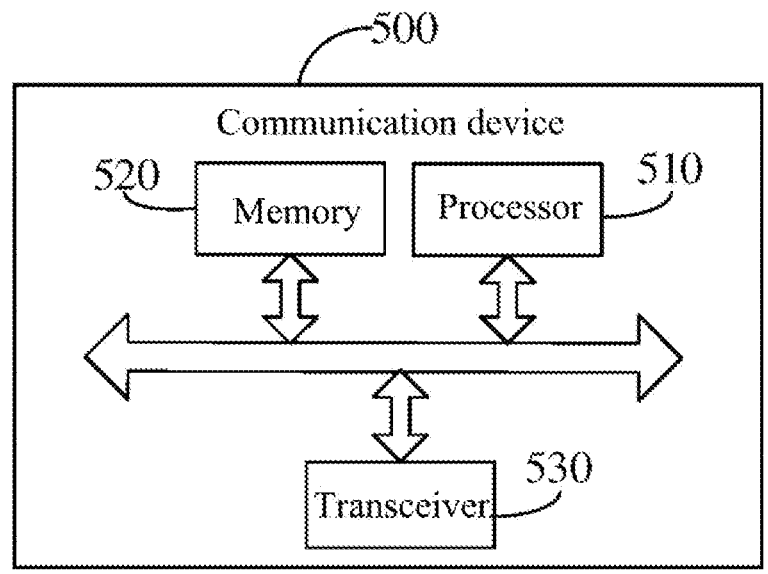
FIG. 9 is a schematic block diagram of a communication device according to an implementation of the present disclosure.

FIG. 9 is a schematic diagram of a structure of a communications device 500 according to an implementation of the present disclosure. The communication device 500 shown in FIG. 9 includes a processor 510, wherein the processor 510 may call and run a computer program from a memory to implement a method in an implementation of the present disclosure.

Optionally, as shown in FIG. 9, the communication device 500 may further include a memory 520. The memory 520 may be configured to store indication information, or may be configured to store codes, instructions, etc., which are executed by the processor 510. The processor 510 may call and run a computer program from the memory 520 to implement a method in an implementation of the present disclosure. The memory 520 may be a separate device independent of the processor 510 or may be integrated in the processor 510.

Optionally, as shown in FIG. 9, the communication device 500 may further include a transceiver 530, and the processor 510 may control the transceiver 530 to communicate with another device. Specifically, information or data may be sent to another device, or information or data sent by another device is received. The transceiver 530 may include a transmitter and a receiver. The transceiver 530 may further include antennas, wherein the number of antennas may be one or more.

Optionally, the communication device 500 may be a network device according to an implementation of the present disclosure, and the communication device 500 may implement corresponding processes implemented by the network device in various methods of implementations of the present disclosure. That is to say, the communication device 500 in the implementation of the present disclosure may correspond to the network device 400 in the implementation of the present disclosure, and may correspond to the corresponding subject in executing the method 200 according to the implementation of the present disclosure, which will not be repeated here for the sake of brevity.

Optionally, the communication device 500 may be a terminal device according to an implementation of the present disclosure, and the communication device 500 may implement corresponding processes implemented by the terminal device in various methods of the implementation of the present disclosure, that is to say, the communication device 500 according to the implementation of the present disclosure may correspond to the terminal device 300 in the implementation of the present disclosure, and may correspond to the corresponding subject in executing the method 200 according to the implementation of the present disclosure, which will not be repeated here for the sake of brevity.

It should be understood that, various components in the communication device 500 are connected through a bus system, wherein, in addition to a data bus, the bus system further includes a power bus, a control bus and a state signal bus.

In addition, an implementation of the present disclosure further provides a chip, wherein the chip may be an integrated circuit chip with signal processing capability, and may implement or perform methods, acts and logical block diagrams disclosed in the implementations of the present disclosure.

Optionally, the chip may be applied in various communication devices, so that a communication device in which the chip is installed can perform methods, acts and logic block diagrams disclosed in implementations of the present disclosure.

Figure 10:
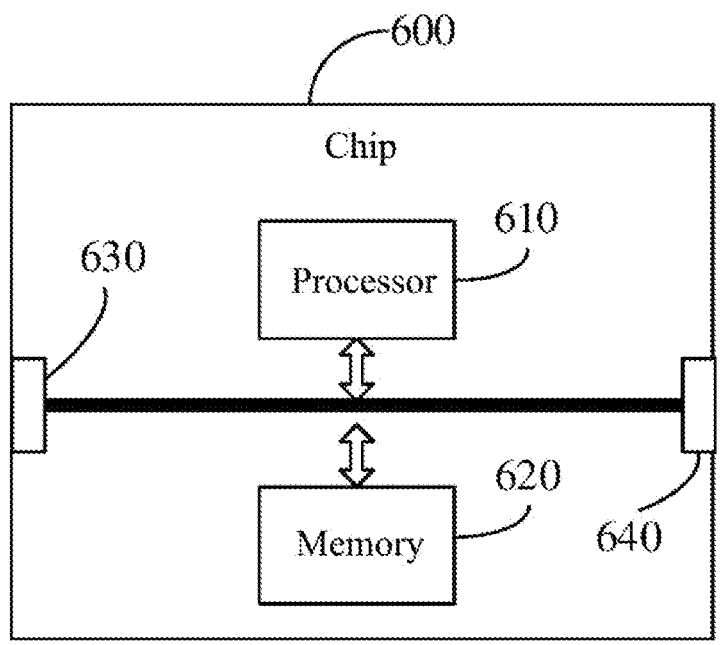
FIG. 10 is a schematic block diagram of a chip according to an implementation of the present disclosure.

FIG. 10 is a schematic structural diagram of a chip according to an implementation of the present disclosure. A chip 600 shown in FIG. 10 includes a processor 610. The processor 610 may call and run a computer program from a memory to implement the method in the implementation of the present disclosure. Optionally, as shown in FIG. 10, the chip 600 may further include a memory 620, wherein the processor 610 may call and run a computer program from the memory 620 to implement the method in the implementation of the present disclosure. The memory 620 may be configured to store indication information, or may be configured to store codes, instructions, etc., executed by the processor 610, wherein the memory 620 may be a separate device independent of the processor 610 or may be integrated in the processor 610.

Optionally, the chip 600 may further include an input interface 630, wherein the processor 610 may control the input interface 630 to communicate with other devices or chips. Specifically, the processor may acquire information or data sent by other devices or chips.

Optionally, the chip 600 may further include an output interface 640, wherein the processor 610 may control the output interface 640 to communicate with other devices or chips. Specifically, the processor may output information or data to other devices or chips.

Optionally, the chip may be applied to a network device in an implementation of the present disclosure, and the chip may implement the corresponding processes implemented by the network device in various methods of the implementations of the present disclosure, which will not be repeated here for sake of brevity.

Optionally, the chip may be applied to a terminal device in an implementation of the present disclosure, and the chip may implement corresponding processes implemented by the terminal device in various methods of implementations of the present disclosure, which will not be repeated here for sake of brevity.

It should be understood that the chip mentioned in the implementations of the present disclosure may be referred to as a system-level chip, a system chip, a chip system or a system-on-chip, etc. It should also be understood that, various components in the chip 600 are connected through a bus system, wherein, in addition to a data bus, the bus system further includes a power bus, a control bus and a state signal bus.

The processor may include, but is not limited to: a general purpose processor, a Digital Signal Processing (DSP), an Application Specific Integrated Circuit (ASIC), a Field Programmable Gate Array (FPGA) or another programmable logic device, a discrete gate or a transistor logic device, or a discrete hardware component, etc.

The processor may be configured to implement or perform methods, acts and logical block diagrams disclosed in the implementation of the present disclosure. The acts of the method disclosed with reference to this implementation of the present disclosure may be directly implemented by a hardware decoding processor, or may be implemented by a combination of hardware and software modules in the decoding processor. The software module may be located in a storage medium commonly used in the art, such as a random memory, a flash memory, a read-only memory, a programmable read-only memory or an erasable programmable memory, or a register, etc. The storage medium is located in the memory, and the processor reads the information in the memory and completes the acts of the above method in combination with its hardware.

The memory includes, but is not limited to, a volatile memory and/or a nonvolatile memory. The non-volatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), and is used as an external cache. As an example, but not as a limitation, many forms of RAMs are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a synch link DRAM (SLDRAM), or a Direct Rambus RAM (DR RAM).

It should be noted that the memory in the systems and methods described in this specification is aimed at including but being not limited to these and any memory of another proper type.

An implementation of the present disclosure further provides a computer readable storage medium, configured to store a computer program. The computer readable storage medium stores one or more programs including instructions which, when performed by a portable electronic device including multiple application programs, enable the portable electronic device to perform the methods of the implementations shown in methods 300 to 500.

Optionally, the computer readable storage medium may be applied to a network device in an implementation of the present disclosure, and the computer program enables a computer to perform corresponding processes implemented by the network device in various methods of the implementations of the present disclosure, which will not be repeated here for sake of brevity.

Optionally, the computer readable storage medium may be applied to a mobile terminal/terminal device in an implementation of the present disclosure, and the computer program enables a computer to perform corresponding processes implemented by the mobile terminal/terminal device in various methods of the implementations of the present disclosure, which will not be repeated here for sake of brevity.

An implementation of the present disclosure further provides a computer program product, including a computer program.

Optionally, the computer program product may be applied to a network device in an implementation of the present disclosure, and the computer program enables a computer to perform corresponding processes implemented by the network device in various methods of the implementations of the present disclosure, which will not be repeated here for sake of brevity.

Optionally, the computer program product may be applied to a mobile terminal/terminal device in an implementation of the present disclosure, and the computer program enables a computer to perform corresponding processes implemented by the mobile terminal/terminal device in various methods of the implementations of the present disclosure, which will not be repeated here for sake of brevity.

An implementation of the present disclosure further provides a computer program. When the computer program is performed by a computer, it enables the computer to perform the methods of the implementations shown in the methods 300 to 500.

Optionally, the computer program may be applied to a network device in an implementation of the present disclosure. When the computer program is run on a computer, the computer is enabled to perform corresponding processes implemented by the network device in various methods of the implementations of the present disclosure, which will not be repeated here for sake of brevity.

An implementation of the present disclosure further provides a communication system. The communication system may include the terminal device 300 as shown in FIG. 7 and the network device 400 as shown in FIG. 8.

Herein, the terminal device 300 may be configured to implement the corresponding functions implemented by the terminal device in the above-mentioned method 200, which will not be repeated here for sake of brevity. The terminal device 400 may be configured to implement the corresponding functions implemented by the network device in the above-mentioned method 200, which will not be repeated here for sake of brevity.

It should be noted that the term "system" or the like in this document may also be called a "network management architecture" or a "network system", etc.

It should also be understood that the terms used in implementations of the present disclosure and the appended claims are for the purpose of describing specific implementations only, but are not intended to limit implementations of the present disclosure.

For example, the singular forms "a", "said", "the above" and "the" used in the implementations of the present disclosure and the appended claims are also intended to include plural forms, unless the context clearly indicates other meanings.

Those skilled in the art may recognize that exemplary units and algorithm acts described in combination with the implementations disclosed herein can be implemented in electronic hardware, or a combination of computer software and electronic hardware. Whether these functions are implemented in hardware or software depends on the specific application and design constraints of the technical solution. Those skilled in the art may use different manners to realize the described functions for each particular application, but such realization should not be considered to be beyond the scope of implementations of the present disclosure.

The function units may be stored in a computer readable storage medium if realized in a form of software functional units and sold or used as a separate product. Based on this understanding, the technical solution of implementations of the present disclosure, in essence, or the part contributing to the existing art, or a part of the technical solution, may be embodied in the form of a software product stored in a storage medium, including several instructions for causing a computer device (which may be a personal computer, a server, or a network device, etc.) to perform all or part of the acts of the methods described in implementations of the present disclosure. The aforementioned storage medium includes a medium capable of storing program codes, such as, a U disk, a mobile hard disk, a read-only memory (ROM), a magnetic disk or an optical disk, etc.

Those skilled in the art may clearly understand that for convenience and conciseness of description, the specific working processes of the systems, apparatuses and units described above may refer to the corresponding processes in the method implementations and will not be described here.

In several implementations provided by the present disclosure, it should be understood that the disclosed systems, devices and methods may be implemented in other ways.

For example, the division of the units or modules in the above-described apparatus implementation is only a logical function division, and there may be another division manner in actual implementation. For example, multiple units or modules or components may be combined or integrated into another system, or some units or modules or components may be ignored or not executed.

For another example, the units/modules/components described above as a separate/display component may or may not be physically separated, that is, may or may not be a physical unit, i.e., it may be located in one place or may be distributed over multiple network units. Part or all of the units/modules/components therein may be selected according to actual needs to achieve a purpose of the implementations of the present disclosure.

Finally, it should be noted that mutual coupling or direct coupling or a communication connection shown or discussed in the text above may be indirect coupling or a communication connection through some interfaces, apparatuses or units, and may be in electrical, mechanical or another form.

The foregoing is merely exemplary implementations of the present disclosure, but the protection scope of implementations of the present disclosure is not limited thereto. Variations or substitutions that may be readily conceived by any person skilled in the art within the technical scope disclosed by implementations of the present disclosure should be covered by the protection scope of implementations of the present disclosure. Therefore, the protection scope of the implementations of the present disclosure should be decided by the protection scope of the claims.

What is claimed is:

1. A terminal device, having a first Packet Data Convergence Protocol (PDCP) entity and a plurality of Radio Link Control (RLC) entities corresponding to the first PDCP entity, and comprising: a processor and a transceiver, wherein
    the transceiver is configured to receive first indication information, wherein the first indication information is used for indicating a data behavior between the first PDCP entity and the plurality of RLC entities, wherein the terminal device is capable of making explicit data actions between the PDCP entity and each RLC entity for both carrier aggregation (CA) and dual connectivity (DC) copies; wherein the transceiver is further configured to: receive an Media Access Control (MAC) Control Element (CE) format, wherein the MAC CE format comprises the first indication information;
    receive second indication information, wherein the second indication information is used for indicating whether the first indication information is comprised in the MAC CE format,
    wherein the transceiver is further configured to:
    receive a reserved index in a Logical Channel Identifier (LCID) of a DownLink Shared Channel (DL-SCH) wherein the reserved index is used for indicating whether the first indication information is comprised in the MAC CE format;
    wherein the transceiver is further configured to:
    receive a second type of MAC CE, the second type of MAC CE is used for indicating a data behavior between an RLC entity and the first PDCP entity corresponding to a second data radio bearer (DRB), wherein the second type of MAC CE is used for indicating a data behavior between the first PDCP entity corresponding to the second DRB and at least three RLC entities.

2. The terminal device of claim 1, wherein the plurality of RLC entities comprise at least two of following RLC entities:
    a first RLC entity, a second RLC entity, a third RLC entity and a fourth RLC entity;
    wherein the first indication information is used for indicating a data behavior between the first PDCP entity and at least one RLC entity among the first RLC entity, the second RLC entity, the third RLC entity, and the fourth RLC entity.

3. The terminal device of claim 1, wherein the transceiver is further configured to:
    receive a Radio Resource Control (RRC) signaling, wherein the RRC signaling comprises information for indicating an initial state of duplication data of the first PDCP entity.

4. The terminal device of claim 1, wherein the processor is configured to report capability information of the terminal device, wherein the capability information comprises whether the first PDCP entity supports a behavior of transmitting data with at least three RLC entities,
    wherein the capability information further comprises:
    a quantity of RLC entities capable of implementing a behavior of data transmission with the first PDCP entity.

5. The terminal device of claim 4, wherein the transceiver is further configured to:
    receive trigger information, wherein the trigger information is used for triggering the terminal device to report the capability information.

6. The terminal device of claim 1,
    wherein when the terminal device receives a MAC CE through an MAC entity, if the MAC CE is used for indicating to activate a data behavior between the RLC entity and a PDCP entity corresponding to a DRB, the terminal device indicates a state of duplication data of the PDCP entity corresponding to the DRB to a higher layer through the MAC entity,
    wherein when the terminal device receives the MAC CE through the MAC entity, if the MAC CE is used for indicating to deactivate a data behavior between the RLC entity and a PDCP entity corresponding to the DRB, the terminal device indicates a state of duplication data of the PDCP entity corresponding to the DRB to a higher layer through the MAC entity.

7. A network device, comprising: a processor and a transceiver, wherein
    the processor is configured to generate first indication information, wherein the first indication information is used for indicating a data behavior between a first Packet Data Convergence Protocol (PDCP) entity of a terminal device and a plurality of Radio Link Control (RLC) entities corresponding to the PDCP entity, wherein the terminal device is capable of making explicit data actions between the first PDCP entity and each RLC entity for both carrier aggregation (CA) and dual connectivity (DC) copies; and the transceiver is configured to send the first indication information to the terminal device, wherein the transceiver is further configured to send a second type of Media Access Control (MAC) Control Element (CE) to the terminal device, wherein the second type of MAC CE is used for indicating a data behavior between an RLC entity and the first PDCP entity corresponding to a second data radio bearer (DRB), wherein the second type of MAC CE is used for indicating a data behavior between the first PDCP entity corresponding to the second DRB and at least three RLC entities; wherein the transceiver is further configured to:

send an MAC CE format to the terminal device, wherein the MAC CE format comprises the first indication information;

send second indication information to the terminal device, wherein the second indication information is used for indicating whether the first indication information is comprised in the MAC CE format, send a reserved index in a Logical Channel Identifier, LCID, of a Downlink Shared Channel, DL-SCH, to the terminal device, wherein the reserved index is used for indicating whether the first indication information is comprised in the MAC CE format.

8. A method for indicating a state of Packet Data Convergence Protocol (PDCP) duplication data, wherein the method is applied to a terminal device, the terminal device has a first PDCP entity and a plurality of Radio Link Control (RLC) entities corresponding to the first PDCP entity, and the method comprises:

receiving, by the terminal device, first indication information, wherein the first indication information is used for indicating a data behavior between the first PDCP entity and the plurality of RLC entities, wherein the terminal device is capable of making explicit data actions between the first PDCP entity and each RLC entity for both carrier aggregation (CA) and dual connectivity (DC) copies; wherein receiving, by the terminal device, the first indication information comprises:

receiving, by the terminal device, an Media Access Control (MAC) Control Element (CE) format, wherein the MAC CE format comprises the first indication information;

receiving, by the terminal device, second indication information, wherein the second indication information is used for indicating whether the first indication information is comprised in the MAC CE format, wherein receiving, by the terminal device, the second indication information comprises:

receiving, by the terminal device, a reserved index in a Logical Channel Identifier (LCID) of a DownLink Shared Channel (DL-SCH) wherein the reserved index is used for indicating whether the first indication information is comprised in the MAC CE format;

wherein receiving, by the terminal device, the first indication further comprises: receiving, by the terminal device, a second type of MAC CE, the second type of MAC CE is used for indicating a data behavior between an RLC entity and the first PDCP entity corresponding to a second data radio bearer (DRB), wherein the second type of MAC CE is used for indicating a data behavior between the first PDCP entity corresponding to the second DRB at least three RLC entities.

9. A method for indicating a state of Packet Data Convergence Protocol (PDCP) duplication data, comprising:

generating, by a first network device, first indication information, wherein the first indication information is used for indicating a data behavior between a first PDCP entity of a terminal device and a plurality of Radio Link Control (RLC) entities corresponding to the PDCP entity, wherein the terminal device is capable of making explicit data actions between the first PDCP entity and each RLC entity for both carrier aggregation (CA) and dual connectivity (DC) copies; and sending, by the first network device, the first indication information to the terminal device wherein sending, by the first network device, the first indication information to the terminal device, comprises:

sending, by the first network device, a second type of Media Access Control (MAC) Control Element (CE) to the terminal device; wherein the second type of MAC CE is used for indicating a data behavior between an RLC entity and the first PDCP entity corresponding to a second data radio bearer (DRB), wherein the second type of MAC CE is used for indicating a data behavior between the first PDCP entity corresponding to the second DRB and at least three RLC entities; wherein sending, by the first network device, the first indication information to the terminal device, comprises:

sending, by the first network device, an MAC CE format to the terminal device, wherein the MAC CE format comprises the first indication information;

wherein the method further comprises:

sending, by the first network device, second indication information to the terminal device, wherein the second indication information is used for indicating whether the first indication information is comprised in the MAC CE format, wherein sending, by the first network device, the second indication information to the terminal device comprises:

sending, by the first network device, a reserved index in a Logical Channel Identifier (LCID) of a DownLink Shared Channel (DL-SCH) to the terminal device, wherein the reserved index is used for indicating whether the first indication information is comprised in the MAC CE format.

* * * * *